United States Patent
Liu et al.

(10) Patent No.: US 8,038,759 B2
(45) Date of Patent: *Oct. 18, 2011

(54) FIBROUS CORDIERITE MATERIALS

(75) Inventors: James Jenq Liu, Mason, OH (US); Bilal Zuberi, Cambridge, MA (US); Rachel A. Dahl, Cambridge, MA (US); William M. Carty, Alfred Station, NY (US)

(73) Assignee: Geo2 Technologies, Inc., Woburn, MA (US)

( * ) Notice: Subject to any disclaimer, the term of this patent is extended or adjusted under 35 U.S.C. 154(b) by 513 days.
This patent is subject to a terminal disclaimer.

(21) Appl. No.: 12/172,217

(22) Filed: Jul. 12, 2008

(65) Prior Publication Data
US 2009/0000260 A1 Jan. 1, 2009

Related U.S. Application Data

(63) Continuation-in-part of application No. 11/753,011, filed on May 24, 2007, and a continuation-in-part of application No. 11/323,429, filed on Dec. 30, 2005, now abandoned.

(60) Provisional application No. 60/737,237, filed on Nov. 16, 2005.

(51) Int. Cl.
*B01D 39/20* (2006.01)
*B01D 46/00* (2006.01)
*C04B 35/03* (2006.01)

(52) U.S. Cl. .......... 55/523; 55/282.3; 55/385.3; 55/524; 55/DIG. 5; 55/DIG. 30; 60/311; 423/213.5; 264/44; 264/628; 264/631; 264/DIG. 48; 501/9; 501/95.1

(58) Field of Classification Search .......... 55/282.2, 55/282.3, 385.3, 523, 524, DIG. 5, DIG. 10, 55/DIG. 30; 60/297, 299, 311; 423/213.2, 423/213.5, 327.2; 428/116; 502/439; 264/43, 264/44, 628, 631, DIG. 48; 501/5, 8, 9, 95.1
See application file for complete search history.

(56) References Cited

U.S. PATENT DOCUMENTS 1,993,821 A 3/1935 Benner et al.
(Continued)

FOREIGN PATENT DOCUMENTS

CN 1349839 5/2002
(Continued)

OTHER PUBLICATIONS

"Fiber-reinforced SiC", *Jpn. Technol. Highlights*, vol. 6, No. 4, ISSN: 1060-8117,(Feb. 22, 1995),15.
"Porosity reduces CMC properties", *Adv. Compos. Bull.*, ISSN: 0951-953X,(Feb. 1995),2-3.
"Rapid preforming developed for metal matrix composites", *High-Performance Composites*, vol. 9, No. 1, ISSN: 1081-9223,(Jan.-Feb. 2001),60.

(Continued)

*Primary Examiner* — Jason M Greene

(57) ABSTRACT

A method of manufacturing a fibrous material includes mixing at least two cordierite precursor materials to form a mixture. One or more of the at least two cordierite precursor materials is in a form of a fiber and the mixture includes about 43% to about 51% by weight $SiO_2$, about 36% to about 41% by weight $Al_2O_3$, and about 12% to about 16% by weight MgO. The method also includes extruding the mixture to create a fibrous body, and heat treating the fibrous body, at a temperature of about 1200° C. to about 1420° C., to form the fibrous material including about 50% to about 95% by weight cordierite. A fibrous body includes an extruded substrate having a plurality of fibers including about 50% to about 95% by weight cordierite. The extruded substrate has a coefficient of thermal expansion in at least one direction of less than about $3.8 \cdot 10^{-6}$ per ° C.

46 Claims, 9 Drawing Sheets

U.S. PATENT DOCUMENTS

| | | | |
|---|---|---|---|
| 3,819,334 A | 6/1974 | Yoshida et al. | |
| 3,899,555 A | 8/1975 | Takeo et al. | |
| 3,912,658 A | 10/1975 | Kaneko et al. | |
| 3,961,907 A | 6/1976 | Close et al. | |
| 4,047,965 A | 9/1977 | Karst et al. | |
| 4,053,011 A | 10/1977 | Riewald et al. | |
| 4,071,594 A | 1/1978 | Pearson et al. | |
| 4,329,162 A * | 5/1982 | Pitcher, Jr. | 55/523 |
| 4,402,893 A | 9/1983 | Kitamura et al. | |
| 4,409,284 A | 10/1983 | Sugino et al. | |
| 4,416,676 A * | 11/1983 | Montierth | 55/523 |
| 4,417,908 A | 11/1983 | Pitcher, Jr. | |
| 4,419,108 A | 12/1983 | Frost et al. | |
| 4,420,316 A | 12/1983 | Frost et al. | |
| 4,434,239 A | 2/1984 | Aitcin | |
| 4,448,833 A | 5/1984 | Yamaguchi et al. | |
| 4,637,995 A | 1/1987 | DeAngelis et al. | |
| 4,652,286 A | 3/1987 | Kusuda et al. | |
| 4,673,658 A | 6/1987 | Gadkaree et al. | |
| 4,761,323 A | 8/1988 | Muhlratzer et al. | |
| 4,810,458 A | 3/1989 | Oshima | |
| 4,824,711 A | 4/1989 | Cagliostro et al. | |
| 4,828,785 A | 5/1989 | Newkirk et al. | |
| 4,833,115 A | 5/1989 | Koschlig et al. | |
| 4,869,944 A * | 9/1989 | Harada et al. | 55/523 |
| 4,968,467 A | 11/1990 | Zievers | |
| 4,973,566 A | 11/1990 | Readey et al. | |
| 5,053,092 A | 10/1991 | Lachman | |
| 5,070,588 A | 12/1991 | Miwa et al. | |
| 5,075,160 A | 12/1991 | Stinton et al. | |
| 5,078,818 A | 1/1992 | Han et al. | |
| 5,098,455 A | 3/1992 | Doty et al. | |
| 5,123,243 A | 6/1992 | Baddour | |
| 5,126,431 A | 6/1992 | Nesheiwat | |
| 5,194,407 A | 3/1993 | Waisala et al. | |
| 5,194,414 A | 3/1993 | Kuma | |
| 5,196,120 A | 3/1993 | White | |
| 5,207,807 A | 5/1993 | Manfre et al. | |
| 5,221,484 A | 6/1993 | Goldsmith et al. | |
| 5,251,564 A | 10/1993 | Rim et al. | |
| 5,258,150 A | 11/1993 | Merkel et al. | |
| 5,290,522 A | 3/1994 | Rogers et al. | |
| 5,316,710 A | 5/1994 | Tasaki et al. | |
| 5,322,537 A | 6/1994 | Nakamura et al. | |
| 5,338,253 A | 8/1994 | Damsohn et al. | |
| 5,348,987 A | 9/1994 | Kato et al. | |
| 5,376,341 A | 12/1994 | Gulati | |
| 5,488,017 A | 1/1996 | Szweda et al. | |
| 5,518,678 A | 5/1996 | Miyamoto et al. | |
| 5,518,833 A | 5/1996 | Repplinger et al. | |
| 5,545,297 A | 8/1996 | Andersen et al. | |
| 5,549,859 A | 8/1996 | Andersen et al. | |
| 5,611,831 A | 3/1997 | Matsuoka et al. | |
| 5,622,041 A | 4/1997 | Feeley et al. | |
| 5,623,013 A | 4/1997 | Tanaka et al. | |
| 5,629,067 A | 5/1997 | Kotani et al. | |
| 5,662,731 A | 9/1997 | Andersen et al. | |
| 5,681,373 A | 10/1997 | Taylor et al. | |
| 5,707,584 A | 1/1998 | Terpstra et al. | |
| 5,714,226 A | 2/1998 | Disselbeck | |
| 5,820,833 A | 10/1998 | Kawamura | |
| 5,851,326 A | 12/1998 | Custer et al. | |
| 5,900,207 A | 5/1999 | Danforth et al. | |
| 5,914,187 A | 6/1999 | Naruse et al. | |
| 5,948,257 A | 9/1999 | Custer et al. | |
| 6,040,266 A | 3/2000 | Fay et al. | |
| 6,077,483 A | 6/2000 | Locker et al. | |
| 6,117,518 A | 9/2000 | Cawse et al. | |
| 6,155,432 A | 12/2000 | Wilson et al. | |
| 6,179,460 B1 | 1/2001 | Burkhardt et al. | |
| 6,194,066 B1 | 2/2001 | Hoffman | |
| 6,228,293 B1 | 5/2001 | Kriegsmann et al. | |
| 6,238,618 B1 | 5/2001 | Brundage et al. | |
| 6,261,510 B1 | 7/2001 | Terpstra et al. | |
| 6,300,266 B1 | 10/2001 | Beall et al. | |
| 6,319,870 B1 | 11/2001 | Beall et al. | |
| 6,321,915 B1 | 11/2001 | Wilson et al. | |
| 6,365,092 B1 | 4/2002 | Backa | |
| 6,375,450 B1 | 4/2002 | Golomb et al. | |
| 6,379,446 B1 | 4/2002 | Andersen et al. | |
| 6,423,537 B1 | 7/2002 | Soria et al. | |
| 6,444,006 B1 | 9/2002 | Haberkamp et al. | |
| 6,471,394 B2 | 10/2002 | Kesig | |
| 6,506,336 B1 | 1/2003 | Beall et al. | |
| 6,541,407 B2 | 4/2003 | Beall et al. | |
| 6,547,967 B1 | 4/2003 | Adler et al. | |
| 6,582,490 B2 | 6/2003 | Miller et al. | |
| 6,613,384 B1 | 9/2003 | Waller | |
| 6,651,773 B1 | 11/2003 | Marocco | |
| 6,669,751 B1 | 12/2003 | Ohno et al. | |
| 6,716,376 B1 | 4/2004 | Haug et al. | |
| 6,860,917 B2 | 3/2005 | Henrichsen et al. | |
| 6,881,361 B1 | 4/2005 | Schulze et al. | |
| 6,899,777 B2 | 5/2005 | Vaidyanathan et al. | |
| 6,935,461 B2 | 8/2005 | Marocco | |
| 6,946,013 B2 | 9/2005 | Alward et al. | |
| 6,991,672 B2 | 1/2006 | Marrecau | |
| 6,991,673 B2 | 1/2006 | Wastijn et al. | |
| 7,041,359 B2 | 5/2006 | Hijikata | |
| 7,052,532 B1 | 5/2006 | Liu et al. | |
| 7,052,760 B2 | 5/2006 | Hijikata | |
| 7,078,086 B2 | 7/2006 | Hijikata | |
| 7,083,842 B2 | 8/2006 | Masukawa et al. | |
| 7,090,715 B2 | 8/2006 | Chung et al. | |
| 7,112,050 B2 | 9/2006 | Bernas et al. | |
| 7,138,002 B2 | 11/2006 | Hamanaka et al. | |
| 7,138,003 B2 | 11/2006 | Ichikawa et al. | |
| 7,179,316 B2 | 2/2007 | Merkel et al. | |
| 7,179,516 B2 | 2/2007 | Ichikawa | |
| 7,572,311 B2 * | 8/2009 | Zuberi | 55/523 |
| 7,578,865 B2 | 8/2009 | Zuberi et al. | |
| 7,862,641 B2 * | 1/2011 | Zuberi et al. | 55/523 |
| 7,938,876 B2 * | 5/2011 | Liu et al. | 55/523 |
| 7,938,877 B2 * | 5/2011 | Liu et al. | 55/523 |
| 2001/0037972 A1 | 11/2001 | Quick et al. | |
| 2002/0014723 A1 | 2/2002 | Wallin et al. | |
| 2002/0157358 A1 | 10/2002 | Noda et al. | |
| 2003/0127393 A1 | 7/2003 | Tepper et al. | |
| 2003/0178357 A1 | 9/2003 | Wolff et al. | |
| 2004/0091709 A1 | 5/2004 | Ohmura et al. | |
| 2004/0139734 A1 | 7/2004 | Schmeichel et al. | |
| 2004/0148916 A1 | 8/2004 | Merkel | |
| 2004/0194505 A1 | 10/2004 | Wang et al. | |
| 2004/0231307 A1* | 11/2004 | Wood et al. | 55/523 |
| 2005/0040003 A1 | 2/2005 | Kienzle et al. | |
| 2005/0042151 A1 | 2/2005 | Alward et al. | |
| 2005/0049362 A1 | 3/2005 | Buckley et al. | |
| 2005/0069469 A1 | 3/2005 | Fu et al. | |
| 2005/0074374 A1 | 4/2005 | Ogura | |
| 2005/0102987 A1 | 5/2005 | Kudo | |
| 2005/0109023 A1 | 5/2005 | Kudo et al. | |
| 2005/0126140 A1 | 6/2005 | Ito et al. | |
| 2005/0181193 A1 | 8/2005 | Lenke et al. | |
| 2005/0212186 A1 | 9/2005 | Noguchi et al. | |
| 2005/0217228 A1 | 10/2005 | Beall et al. | |
| 2005/0230029 A1 | 10/2005 | Vaidyanathan et al. | |
| 2005/0271920 A1 | 12/2005 | Eshraghi et al. | |
| 2006/0075731 A1 | 4/2006 | Ohno et al. | |
| 2006/0154057 A1 | 7/2006 | Nonninger | |
| 2006/0292393 A1 | 12/2006 | Kunieda | |
| 2007/0032370 A1 | 2/2007 | Weisensel et al. | |
| 2007/0044443 A1 | 3/2007 | Nixdorf et al. | |
| 2007/0077190 A1 | 4/2007 | Ohno | |
| 2007/0111878 A1 | 5/2007 | Zuberi et al. | |
| 2007/0261557 A1 | 11/2007 | Gadkaree et al. | |
| 2009/0000260 A1 | 1/2009 | Liu et al. | |
| 2009/0136709 A1 | 5/2009 | Zuberi et al. | |
| 2009/0166910 A1 | 7/2009 | Marshall et al. | |

FOREIGN PATENT DOCUMENTS

| | | |
|---|---|---|
| EP | 0552715 | 7/1993 |
| EP | 0635298 | 1/1995 |
| EP | 0728521 | 8/1996 |
| EP | 00776696 | 6/1997 |
| EP | 01338326 | 8/2003 |
| EP | 01440722 | 7/2004 |
| EP | 01541216 | 6/2005 |

| | | |
|---|---|---|
| GB | 2176179 | 12/1986 |
| JP | 61230747 | 10/1986 |
| JP | 63242980 | 10/1988 |
| JP | 03258347 | 11/1991 |
| JP | 06031177 | 2/1994 |
| JP | 07000757 | 1/1995 |
| JP | 2001-252529 | 9/2001 |
| KR | 2001016633 | 3/2001 |
| WO | WO-03/031368 | 4/2003 |
| WO | WO-2006070540 | 7/2006 |

OTHER PUBLICATIONS

Gulati, Suresh T., "Physical Durability of Thin Wall Ceramic Substrates", *SAE Technical Paper Series 982635*, (Oct. 1998).

"Diesel Filter Materials", *DieselNet Technology Guide*, www.DieselNet.com,(Jan. 2003).

"Wall-Flow Monoliths", *DieselNet Technology Guide*, www.DieselNet.com,(Sep. 2005).

"Ceramic Catalyst Substrates", *DieselNet Technology Guide*, www.DieselNet.com,(Apr. 1997).

"Ceramic Fibers and Cartridges", *DieselNet Technology Guide*, www.DieselNet.com,(Jul. 2001).

Cooke, Theodore F., "Inorganic Fibers—A Literature Review", *J. Am. Ceram. Soc.*, 74 (12), (1991),2959-2978.

Miller, Robert K., et al., "Design, Development and Performance of a Composite Diesel Particulate Filter", *SAE Technical Paper Series*, 2002-01-0323,(Mar. 2002).

Li, Cheng G., et al., "Properties and Performance of Diesel Particulate Filters of an Advanced Ceramic Material", *SAE Technical Paper Series*, 2004-01-0955,(Mar. 2004).

Blackburn, Stuart et al., "Mullite-Alumina Composites by Extrusion", *J. Am. Ceram. Soc.* 75[4], (1992),953-957.

\* cited by examiner

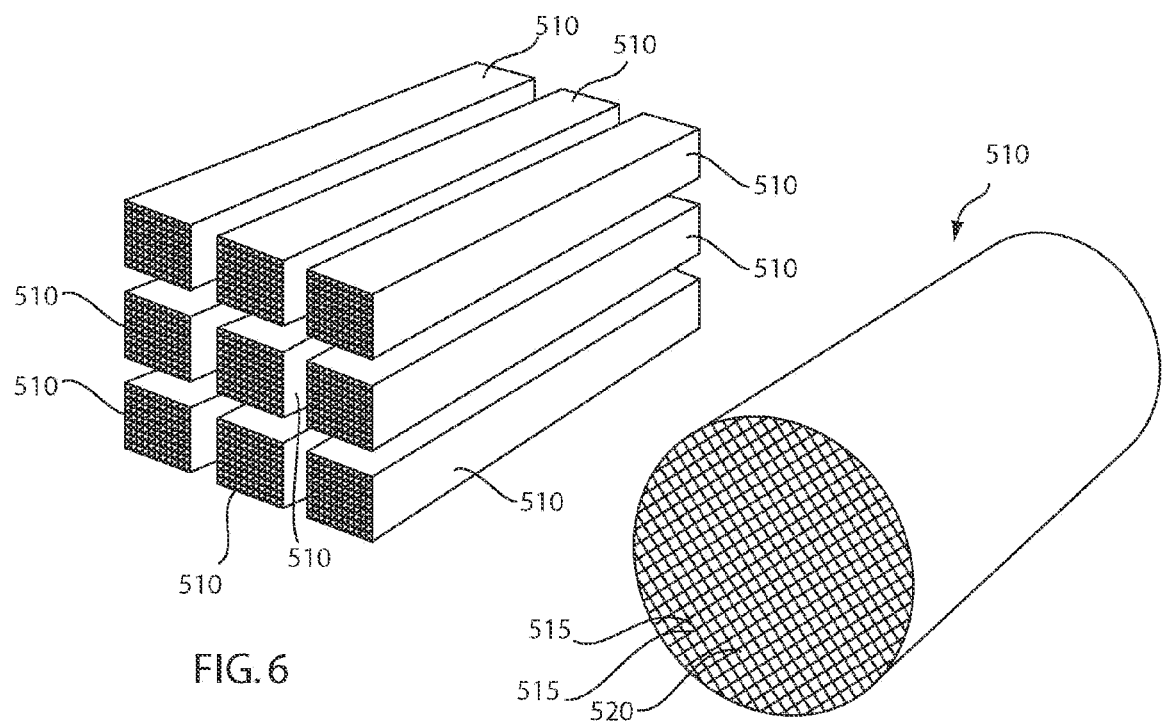
FIG. 6
FIG. 5
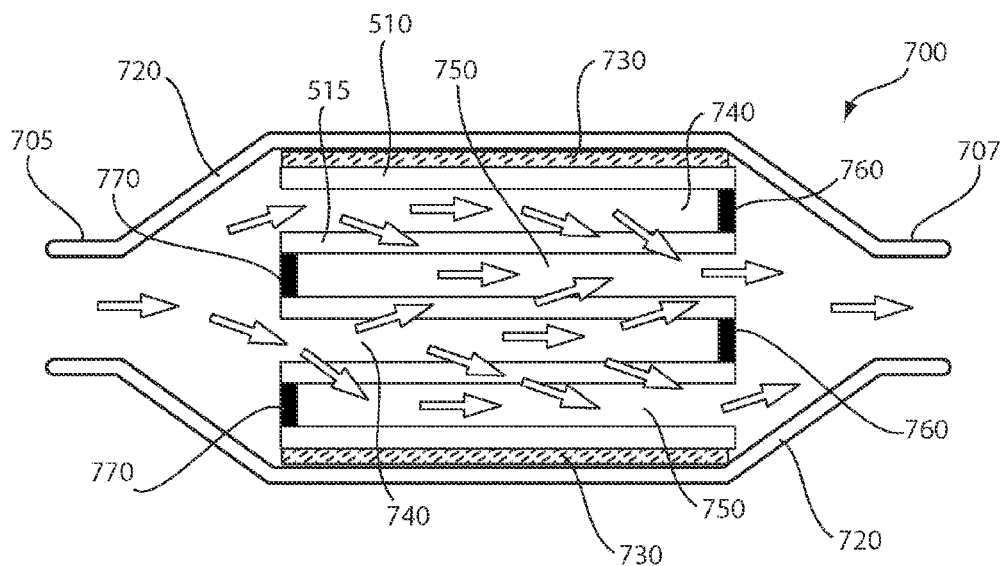
FIG. 7

US 8,038,759 B2

FIBROUS CORDIERITE MATERIALS

RELATED APPLICATIONS

This application is a continuation-in-part of U.S. Ser. No. 11/753,011 filed May 24, 2007 and entitled "Cordierite Fiber Substrate and Method for Forming the Same" and a continuation-in-part of U.S. Ser. No. 11/323,429 filed on Dec. 30, 2005 and entitled "Extruded Porous Substrate and Products Using the Same." Application Ser. No. 11/323,429 claims the benefit of provisional application Ser. No. 60/737,237, filed on Nov. 16, 2005. The entire disclosures of application Ser. Nos. 11/753,011, 11/323,429 and 60/737,237 are incorporated herein by reference.

FIELD OF THE INVENTION

The invention generally relates to a fibrous cordierite materials, and more particularly to a low coefficient of thermal expansion fibrous materials including a plurality of fibers having about 50% to about 95% by weight cordierite and methods of manufacturing the fibrous cordierite materials.

BACKGROUND

Advanced ceramic materials are commonly utilized in systems located in hostile environments, such as, for example, automotive engines (e.g., catalytic converters), aerospace applications (e.g., space shuttle titles), refractory operations (e.g., firebrick) and electronics (e.g., capacitors, insulators). Porous ceramic bodies are of particular use as filters in these environments. For example, today's automotive industry uses ceramic honeycomb substrates (i.e., a porous ceramic body) to host catalytic oxidation and reduction of exhaust gases, and to filter particulate emissions. Ceramic honeycomb substrates provide high specific surface area for filtration and support for catalytic reactions and, at the same time, are stable and substantially structurally sound at high operating temperatures associated with an automotive engine environment.

In general, ceramic materials, such as for example, cordierite based ceramics, are inert materials that perform well in high temperature environments. However, ceramic materials are not immune to thermal stresses, such as those stresses generated from cycling between ambient temperature and high temperature applications. Thus, ceramic filters are known to degrade making them inefficient and ineffective for today's applications.

SUMMARY OF THE INVENTION

In general, embodiments described herein feature a fibrous ceramic material that can be utilized in a variety of applications, including as a filter in an automotive engine environment. The fibrous ceramic material includes a plurality of cordierite fibers (i.e., fibers having about 50% to about 95% by weight cordierite). Embodiments described herein also feature methods of making the fibrous ceramic material. Specifically, in one embodiment, the fibrous ceramic material is made by forming the cordierite fibers via a reaction between two or more precursor materials, where at least one of the two or more precursor materials is in the form of a fiber. It is believed that a lower coefficient of thermal expansion (CTE) can be achieved by altering the chemical composition of the cordierite fibers. That is, by altering the wt % cordierite in the fibers, the chemical compositions as well as the crystal structure of the fibers can be changed. Additionally, by altering the wt % ratios of $SiO_2$, $Al_2O_3$, and MgO in the precursor materials (i.e., within the range of about 43% to about 51% by weight $SiO_2$, about 36% to about 41% by weight $Al_2O_3$, and about 12% to about 16% by weight MgO), the chemical compositions as well as the crystal structure of the fibers can be changed. As a result of the compositional and structural changes, the CTE value for the material can be tailored for a particular use (e.g., the CTE value can be lowered in one or more lattice directions). Due to the decrease in CTE, a porous, fibrous ceramic body with minimal cracking and minimal expansion at high temperatures can be generated.

In some embodiments, the CTE value of the fibrous ceramic material can be further lowered as a result of fiber orientation. The plurality of cordierite fibers made by the reaction can be extruded or otherwise shaped into a fibrous body. During extrusion or shaping, it is believed that fiber alignment occurs resulting in a decrease of the coefficient of thermal expansion (CTE) in at least one direction of the fibrous body.

In one aspect, embodiments described in the present disclosure are directed to a method of manufacturing a fibrous material. The method includes mixing at least two cordierite precursor materials to form a mixture, where one or more of the at least two cordierite precursor materials is in a form of a fiber, and where the mixture includes about 43% to about 51% by weight $SiO_2$, about 36% to about 41% by weight $Al_2O_3$, and about 12% to about 16% by weight MgO. The method also includes extruding the mixture to create a fibrous body. Furthermore, the method includes heat treating the fibrous body, at a temperature of about 1200° C. to about 1420° C., to form the fibrous material. The fibrous material includes about 50% to about 95% by weight cordierite.

Embodiments of this aspect can include one or more of the following features. In various embodiments heat treating has a duration between about 2 and about 12 hours. In some embodiments the temperature is about 1250° C. to about 1375° C. In certain embodiments the fibrous material includes about 65% to about 90% by weight cordierite. In various embodiments, the mixture includes one or more additives selected from the group consisting of a fluid, a binder, and a pore former. The one or more additives can be substantially removed by heating the fibrous body.

In another aspect, embodiments described in the present disclosure are directed to a method of manufacturing a matrix of bonded fibers. The method includes mixing at least two cordierite precursor materials to form a mixture, where one or more of the at least two cordierite precursor materials is in a form of a fiber, and where the mixture includes about 43% to about 51% by weight $SiO_2$, about 36% to about 41% by weight $Al_2O_3$, and about 12% to about 16% by weight MgO. The method also includes reacting the at least two cordierite precursor materials, at a temperature of about 1200° C. to about 1420° C., to form the matrix of bonded fibers within the mixture. The matrix of bonded fibers includes about 50% to about 95% by weight cordierite.

Embodiments of this aspect can include one or more of the following features. In various embodiments heat treating has a duration between about 2 and about 12 hours. In some embodiments the temperature is about 1250° C. to about 1375° C. In certain embodiments the matrix of bonded fibers includes about 65% to about 90% by weight cordierite. In various embodiments, between about 40% and about 85% of fibers within the matrix of bonded fibers are aligned in a common direction. In one embodiment, between about 60% and about 75% of fibers within the matrix of bonded fibers are aligned in a common direction. In some embodiments, the mixture also includes one or more additives selected from a fluid, a binder, and a pore former. The one or more additives can be substantially removed by reacting the at least two cordierite precursor materials. In certain embodiments, the method also includes shaping the mixture into a fibrous body.

In still another aspect, embodiments described in the present disclosure are directed to a method of forming a porous honeycomb substrate. The method includes mixing at least two cordierite precursor materials to form a mixture, where one or more of the at least two cordierite precursor materials is in a form of a fiber, and where the mixture includes about 43% to about 51% by weight $SiO_2$, about 36% to about 41% by weight $Al_2O_3$, and about 12% to about 16% by weight MgO. The method also includes extruding the mixture to form a honeycomb substrate having a porosity of at least about 20%. Furthermore, the method includes heat treating the honeycomb substrate, at a temperature of about 1200° C. to about 1420° C., to react the at least two cordierite precursor materials to form a plurality of fibers including about 50% to about 95% by weight cordierite.

Embodiments of this aspect can include one or more of the following features. In various embodiments heat treating has a duration between about 2 and about 12 hours. In some embodiments the temperature is about 1250° C. to about 1375° C. In certain embodiments the plurality of fibers includes about 65% to about 90% by weight cordierite. In various embodiments, the mixture also includes one or more additives selected from a fluid, a binder, and a pore former. The one or more additives can be substantially removed by heating the honeycomb substrate.

In yet another aspect, embodiments described in the present disclosure are directed to a fibrous body. The fibrous body includes an extruded substrate having a plurality of fibers including about 50% to about 95% by weight cordierite. The extruded substrate has a coefficient of thermal expansion in at least one direction of less than about $3.8 \cdot 10^{-6}$ per ° C.

Embodiments of this aspect can include one or more of the following features. In various embodiments the fibers have a coefficient of thermal expansion in at least one direction of less than about $2.5 \cdot 10^{-6}$ per ° C. In some embodiments the fibers have a coefficient of thermal expansion in at least one direction between about $-12 \cdot 10^{-7}$ and about $3.8 \cdot 10^{-6}$ per ° C. In certain embodiments between about 40% and about 85% of fibers within the fibrous body are aligned in a common direction. In one embodiment between about 60% and about 75% of fibers within the fibrous body are aligned in a common direction. In various embodiments, the fibrous body has a crush strength between about 250 psi and about 2500 psi. In some embodiments, the fibrous body has a modulus of rupture between about 1.6 MPa and about 8.5 MPa. In one embodiment, the fibrous body has a modulus of rupture below about 5.6 MPa. In certain embodiments, the fibrous body has a modulus of elasticity between about 2.8 GPa and about 10.3 GPa. In various embodiments, the fibrous body includes about 43% to about 51% by weight $SiO_2$, about 36% to about 41% by weight $Al_2O_3$, and about 12% to about 16% by weight MgO. In some embodiments, the extruded substrate is formed from a mixture of cordierite precursors including about 43% to about 51% by weight $SiO_2$, about 36% to about 41% by weight $Al_2O_3$, and about 12% to about 16% by weight MgO.

In still yet another aspect, embodiments described in the present disclosure are directed to a fibrous honeycomb body including a honeycomb array of walls defining channels between adjacent walls. The walls include a plurality of fibers bonded to form a porous structure having an open network of pores. The fibers include about 50% to about 95% by weight cordierite. The honeycomb has a coefficient of thermal expansion in at least one direction of less than about $3.8 \cdot 10^{-6}$ per ° C.

Embodiments of this aspect can include one or more of the following features. In various embodiments the fibers have a coefficient of thermal expansion in at least one direction of less than about $2.5 \cdot 10^{-6}$ per ° C. In some embodiments the fibers have a coefficient of thermal expansion in at least one direction between about $-12 \cdot 10^{-7}$ and about $3.8 \cdot 10^{-6}$ per ° C. In certain embodiments between about 40% and about 85% of fibers within the fibrous honeycomb body are aligned in a common direction. In one embodiment between about 60% and about 75% of fibers within the fibrous honeycomb body are aligned in a common direction. In various embodiments, the fibrous honeycomb body has a crush strength between about 250 psi and about 2500 psi. In some embodiments, the fibrous honeycomb body has a modulus of rupture between about 1.6 MPa and about 8.5 MPa. In some embodiments, the fibrous honeycomb body has a modulus of rupture below about 5.6 MPa. In certain embodiments, the fibrous honeycomb body has a modulus of elasticity between about 2.8 GPa and about 10.3 GPa. In various embodiments, the fibrous honeycomb body includes a catalytic coating on the plurality of fibers. In some embodiments, the fibrous honeycomb body includes about 43% to about 51% by weight $SiO_2$, about 36% to about 41% by weight $Al_2O_3$, and about 12% to about 16% by weight MgO. In certain embodiments, the plurality of fibers are formed from a mixture of cordierite precursors including about 43% to about 51% by weight $SiO_2$, about 36% to about 41% by weight $Al_2O_3$, and about 12% to about 16% by weight MgO.

In another aspect, embodiments described in the present disclosure are directed to a filter including a housing having an inlet and an outlet. The filter also includes a fibrous honeycomb body, as described above, disposed between the inlet and the outlet.

Embodiments of this aspect can include at least one catalyst deposited on the plurality of fibers of the walls.

BRIEF DESCRIPTION OF THE DRAWINGS

In the drawings, like reference characters generally refer to the same parts throughout the different views. Also, the drawings are not necessarily to scale, emphasis instead being placed upon illustrating the principles of the invention.

FIG. 5 is a schematic illustrated in a perspective view showing a honeycomb body.

FIG. 6 is a schematic illustrated in a perspective view showing multiple honeycomb bodies to be adjoined to form a larger body.

FIG. 7 is a cross-sectional schematic of a filter that includes a honeycomb body of FIG. 5.

DETAILED DESCRIPTION

In general, by reducing a ceramic material's CTE value, cracking due to thermal stresses can be minimized. The ceramic materials described below have a low CTE value. It is believed that the ceramic materials described herein have achieved a low CTE value by a manipulation of one or more of the lattice parameters through an adjustment in compositional structure of the ceramic material. In addition, in some embodiments, a further decrease in CTE value may be achieved through fiber alignment within the ceramic material.

The ceramic materials described herein can be utilized in numerous applications, including but not limited to filters for diesel applications. In diesel automotive applications, using ceramic materials that have a high coefficient of thermal expansion within a catalytic filter can lead to poor or diminished performance and/or design flexibility. Specifically, diesel filters are prone to cracking during regeneration (i.e., a high temperature cycle used to burn out particulates trapped in the filter). Therefore, it would be advantageous to minimize the coefficient of thermal expansion of a ceramic material used in a diesel filter. In addition, performance of a diesel filter increases with an increased value for the thermal shock parameter (TSP). The thermal shock parameter is defined as follows: TSP=modulus of rupture (MOR) divided the product of Young's modulus and the coefficient of thermal expansion (CTE). As a result, a ceramic material having a low coefficient of thermal expansion will have greater performance.

Figure 1:
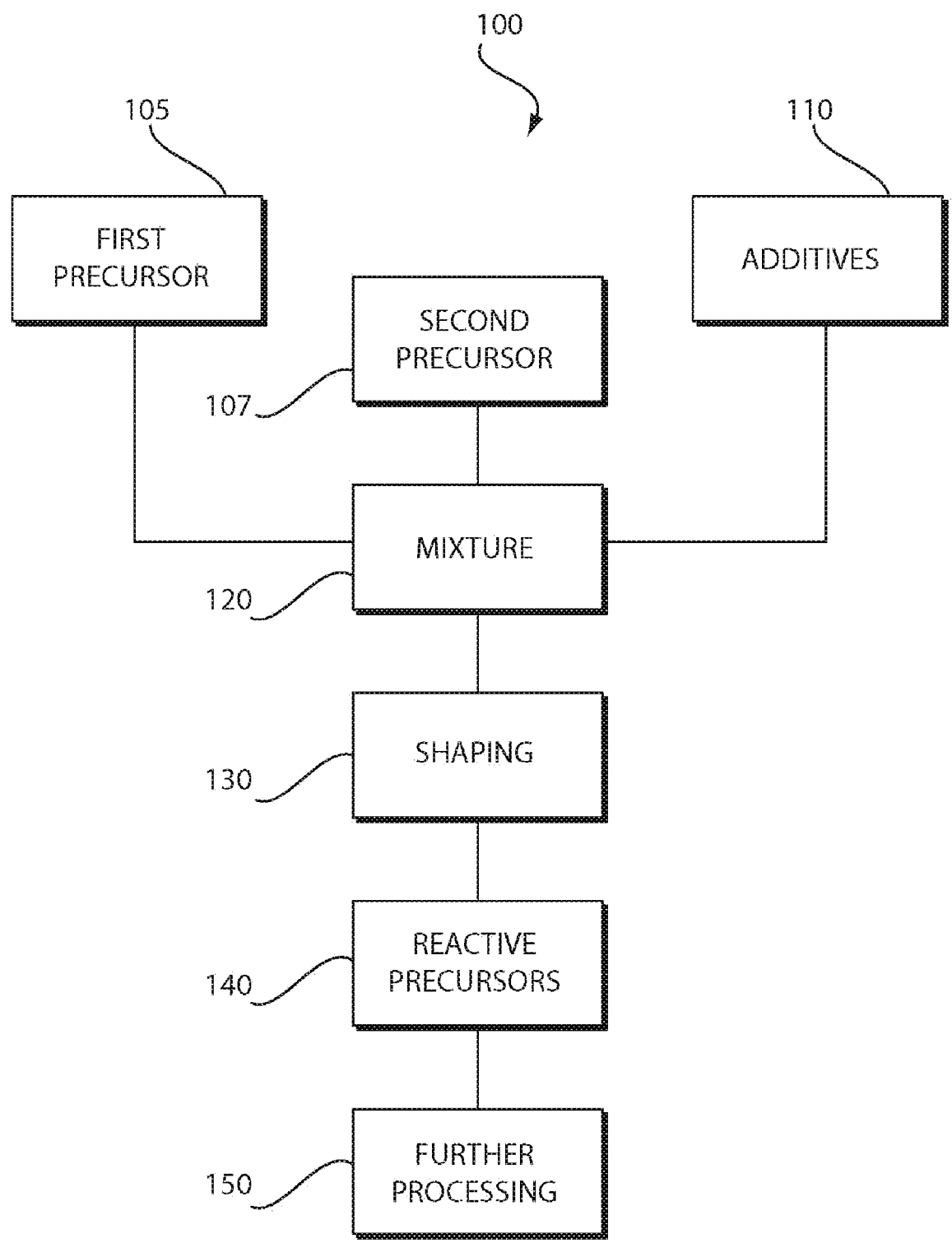
FIG. 1 is a flow chart illustrating a method of forming a fibrous material in accordance with an embodiment of the disclosure.

Referring to FIG. 1, a method 100 for manufacturing a fibrous material is illustrated. The fibrous material formed using this method has an ultimate or final structure (i.e., a structure after completion of the method shown in FIG. 1) in which the fibrous material includes about 50% to about 95% by weight cordierite. The fibers within the final structure are interlocking, so as to form a three dimensional porous structure in which fluids (e.g., gases) can pass through. The method includes mixing at least two cordierite precursor materials, such as a first precursor 105 and a second precursor 107 to form a mixture 120 including about 43% to about 51% by weight $SiO_2$, about 36% to about 41% by weight $Al_2O_3$, and about 12% to about 16% by weight MgO. (While FIG. 1, shows two precursors, any number of precursors greater than or equal to two can be utilized.) A cordierite precursor is a material that can, when reacted with one or more additional precursor materials, form a portion of the fibrous material including about 50% to about 95% by weight cordierite.

Optionally, additives 110, such as, for example binders, rheology modifiers (e.g., fluids), and pore formers can be introduced into mixture 120. These additives 110 can be used to modify or manipulate the consistency of mixture 120 so as to aid in later form shaping processes. In addition, these additives 110 can be used as pore place holders. That is, these additives are inert with respect to the cordierite precursors and can be removed from the mixture 120 after the form shaping processes, thereby allowing for increased porosity in the ultimate form.

After the cordierite precursors (i.e., 105 and 107) with any optional additives 110 are mixed and homogenized, the mixture 120 is shaped 130 into a form. In one embodiment, shaping 130 can occur by extrusion of the mixture 120. Without wishing to be bound by theory, it is believed that extrusion of a fibrous mixture, such as mixture 120, results in the substantial alignment of fibers. For example, in various embodiments, it is believed that at least about 20% of the fibers within a fibrous mixture are substantially aligned in a common direction after extrusion. In some embodiments, between about 40% and about 85% of fibers within the fibrous body are aligned in a common direction. In certain embodiments, between about 60% and about 75% of fibers within the fibrous body are aligned in a common direction.

Figure 2A:
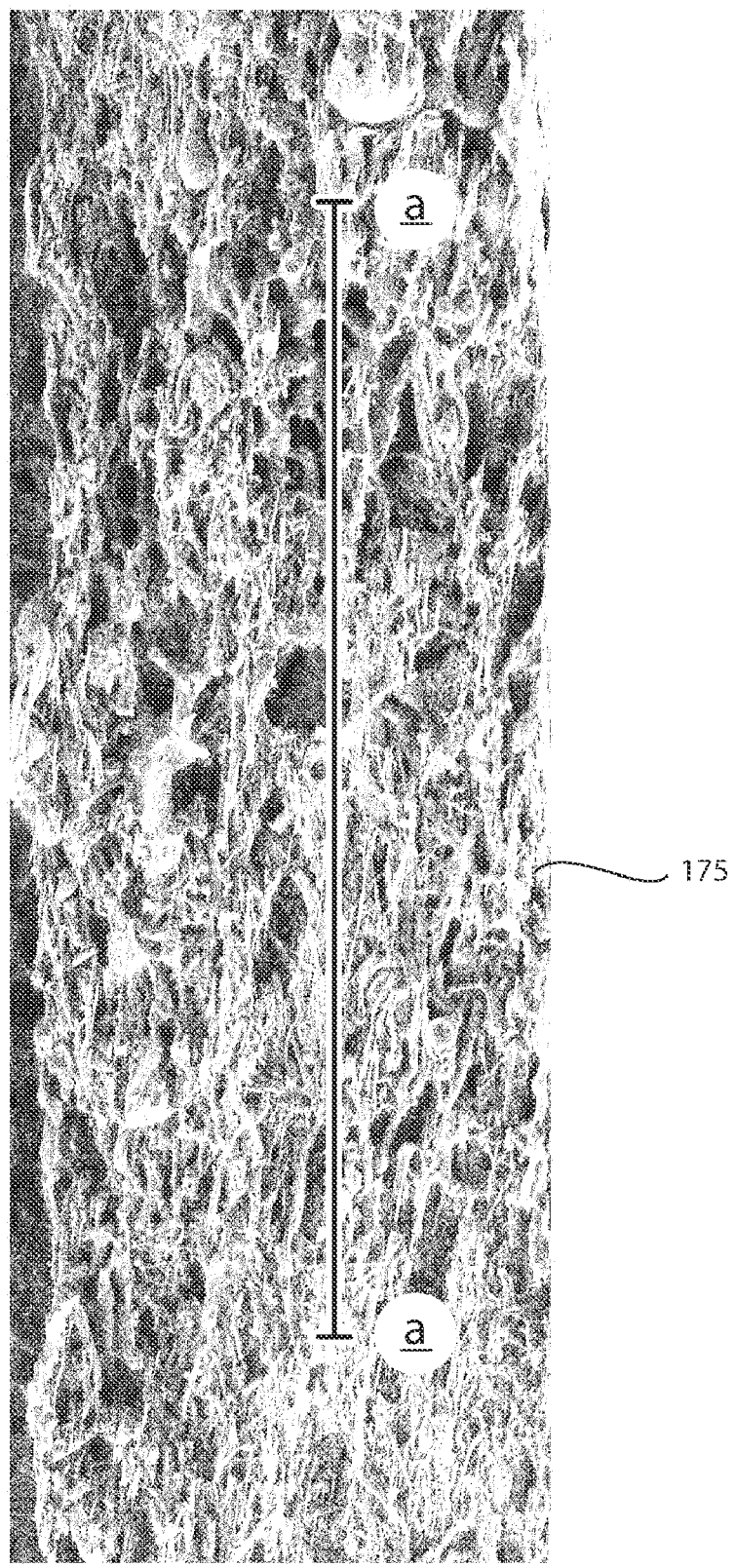
FIG. 2A is a exemplary micrograph a portion of a fibrous material of the type formed in accordance with the method of FIG. 1.

FIG. 2A shows an extruded fibrous structure 175 in which an average of about 70 to 80% of all fibers within the form are aligned along line a-a shown therein. Shear forces that act upon the mixture during extrusion tend to orient the fibers in the direction of extrusion. It will be appreciated that extrusion designs, mixture rheologies, fiber content and fiber rigidity can influence the orientation behavior of the extruded mixture.

Figure 2B:
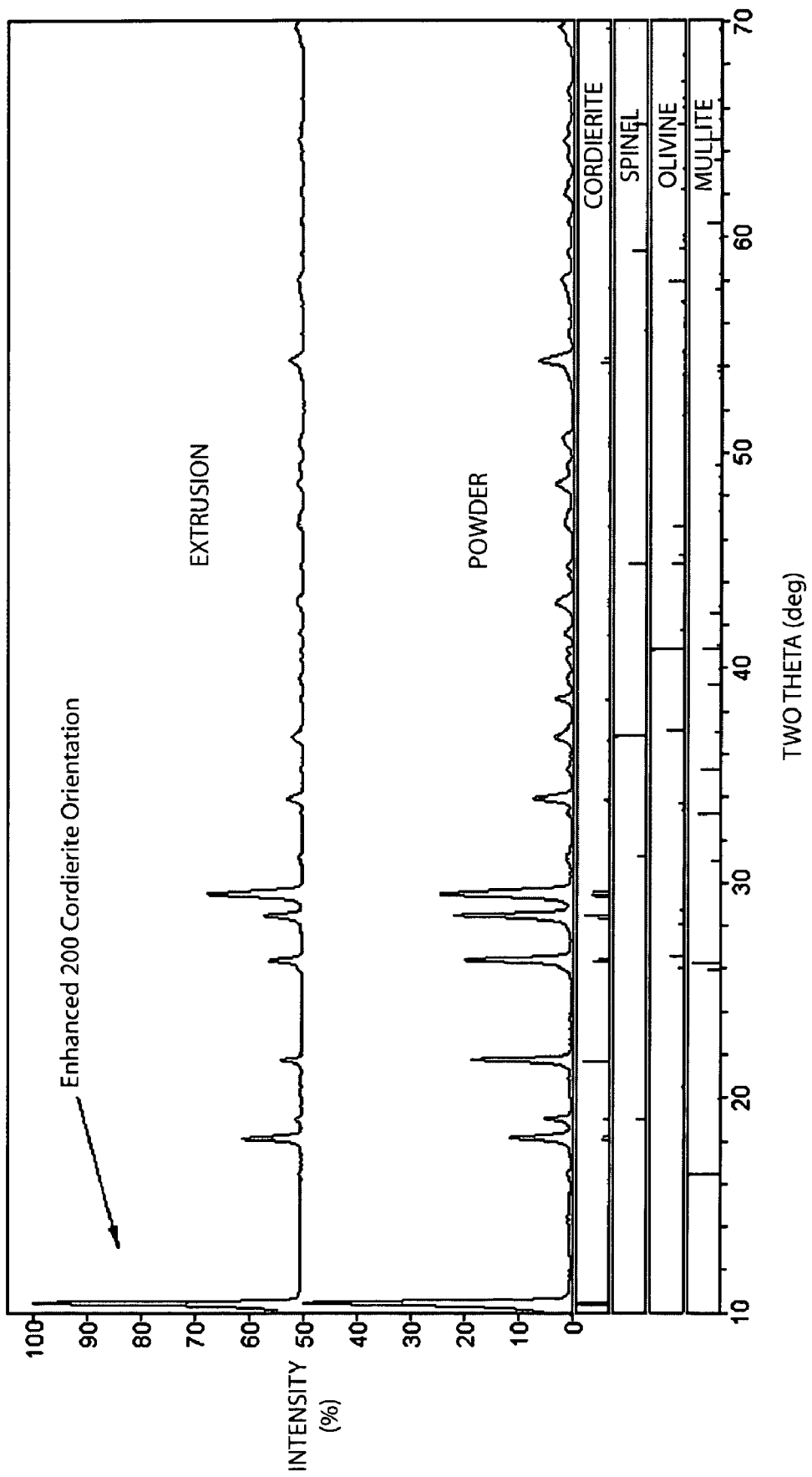
FIG. 2B is a XRD analysis of extruded and powdered cordierite samples.

FIG. 2B shows a XRD diffraction patterns for extruded and powdered cordierite samples. One sample was tested as extruded shape ("extruded sample") and the other was crushed and ground into a fine powder ("powdered sample"). The chemical composition of the two samples is identical, the only difference being the physical modification (e.g., destruction of structure) in the powdered sample. Both samples were both tested in a Siemens D5000 diffractometer using Cu radiation at 40 KV/30 mA over the angular range of 100-700 with a step size of 0.020 and exposure time of 8 hours. The extruded sample has a (200) cordierite preferred orientation (e.g., as evidenced by the higher than expected intensity of the peak at 10.50 and general suppression of other peaks). FIG. 2B also shows that the intensities of some of the other peaks change in relationship to one another, indicating a complex response to the extrusion, but the dominant effect is the (200) preferred orientation.

TABLE 1

Comparison of peak intensities of extruded and powdered samples shown in FIG. 2B.

| | Relative Intensities | |
|---|---|---|
| Angle | Random Powder | Wafer |
| 10.30° | 100 | 100 |
| 18.00° | 22 | 22 |
| 21.61° | 37 | 7 |
| 26.23° | 40 | 12 |
| 28.31° | 43 | 14 |
| 29.37° | 48 | 35 |
| 33.81° | 14 | 6 |
| 36.68° | 6 | 4 |
| 54.17° | 6 | 5 |
| 42.95° | 12 | 3 |

The percent fiber alignment of the extruded sample is estimated to be between about 63% and about 71% from the XRD analysis of both samples. In particular, the "I ratio" is computed to be:

$$I=I_{110}/(I_{110}+I_{200})$$

where $I_{110}$ is a measurement of the intensity of the (110) plane (preferred alignment) and $I_{200}$ is the measurement of the intensity for the (200) plane (which is perpendicular to the (110) plane). The I ratio for the extruded sample was 0.89.

The I ratio for the powder sample was between about 0.62 and about 0.70 (e.g., random orientation). Thus, assuming a straight line interpolation between totally random alignment and a theoretical maximum I ratio of 1 (e.g., fully aligned), the fiber alignment of the extruded sample is approximated to be between about 63% and about 71%.

Other shaping processes 130, other than extrusion, can also be utilized to create the form. Examples of other shaping processes include molding, such as injection molding, and casting. In these shaping processes, fiber alignment may occur to a lesser degree than with extrusion.

Once shaped, energy is applied to the form to initiate a reaction 140 between the precursors 105 and 107. For example, the form can be fired at a temperature of about 1200° C. to about 1420° C. In some embodiments, the temperature is about 1250° C. to about 1375° C. The firing can last for several hours, to cause a reaction between the two or more cordierite precursors. For example, heat treating can have a duration between about 2 and about 12 hours. As a result of this reaction, the precursors are transformed into fibers including about 50% to about 95% by weight cordierite. In some embodiments, the precursors are transformed into fibers including about 65% to about 90% by weight cordierite. In general, the yield of cordierite produced from reaction 140 is high such that the fiber resulting from the reaction includes at least 50% by weight cordierite.

Figure 3A:
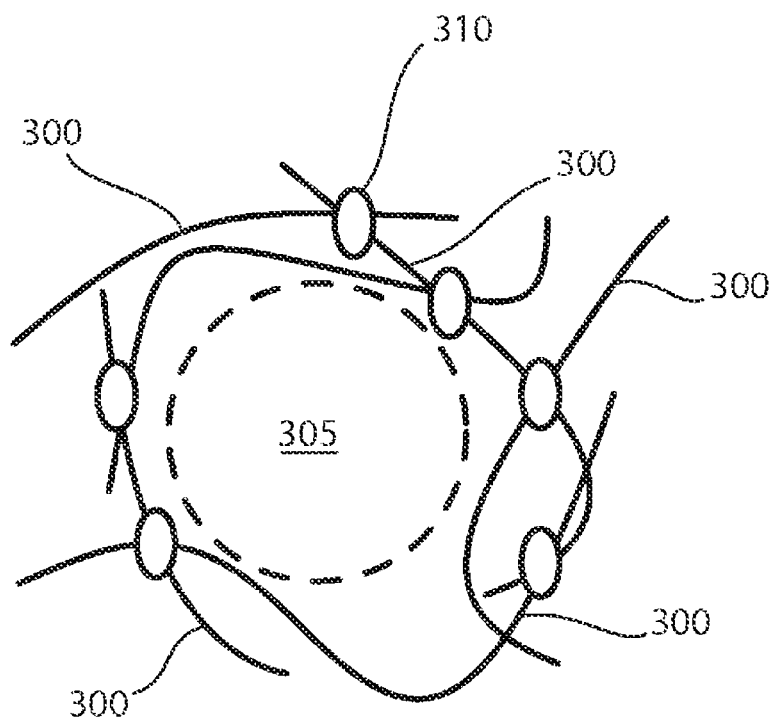
FIGS. 3A and 3B are cross-sectional schematics illustrating the presence and the absence of pore formers and binders prior to and after a heat treatment, respectively.
Figure 3B:
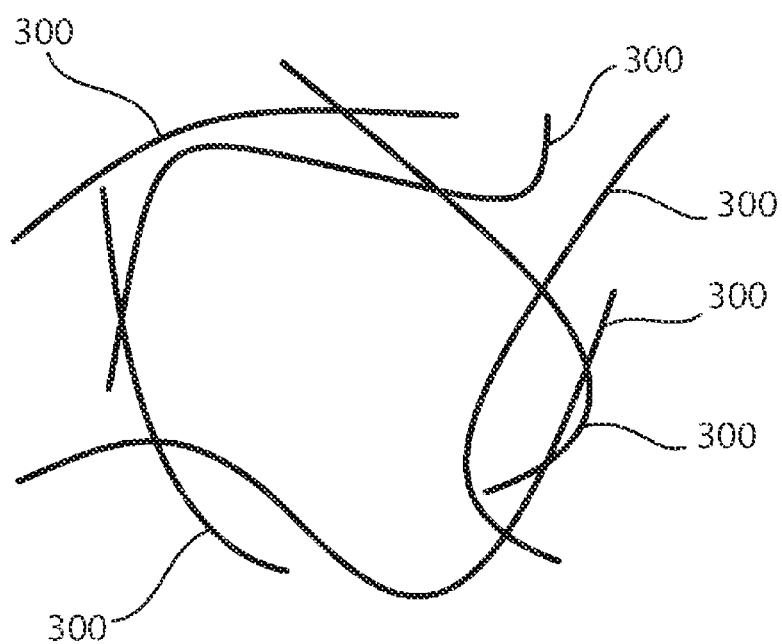

The application of energy (e.g., heat) also allows for the creation of bonds between the fibers. As heat is applied (e.g., directly in the case of a furnace or inductively as when an RF source is utilized), water and other additives are eliminated or reduced resulting in fiber-to-fiber contact. (See FIGS. 3A and 3B showing fiber 300 interactions as a result of the presence and the removal of pore formers 305 and binders 310, respectively). It will be appreciated that the bonds may be formed in several ways at these fiber-to-fiber contact sites. For example, a number of types of sintering mechanism can be utilized, including but not limited to liquid assisted sintering, solid state sintering, and reaction-phase sintering wherein a chemical reaction occurs at the fiber-to-fiber contact site. As a result of fiber bond formation, the fibrous material formed utilizing method 100 has interlocked fibers, wherein fibers comprises about 50% to about 95% by weight cordierite.

As an optional step, the fibrous form can be further processed as shown in step 150 in FIG. 1. Further processing steps include: (a) additional heat treatments to create further bonds between fibers or to remove additives such as pore formers, organic binders, and fluids, such as water (b) application of coatings, such as, for example catalytic coatings on the fibers, (c) introduction of increased porosity or creation of directed flow channels via mechanical processing (e.g., drilling or capping/filling passageways), and (d) incorporating the fibrous material into a filter or other apparatus.

Figure 4:
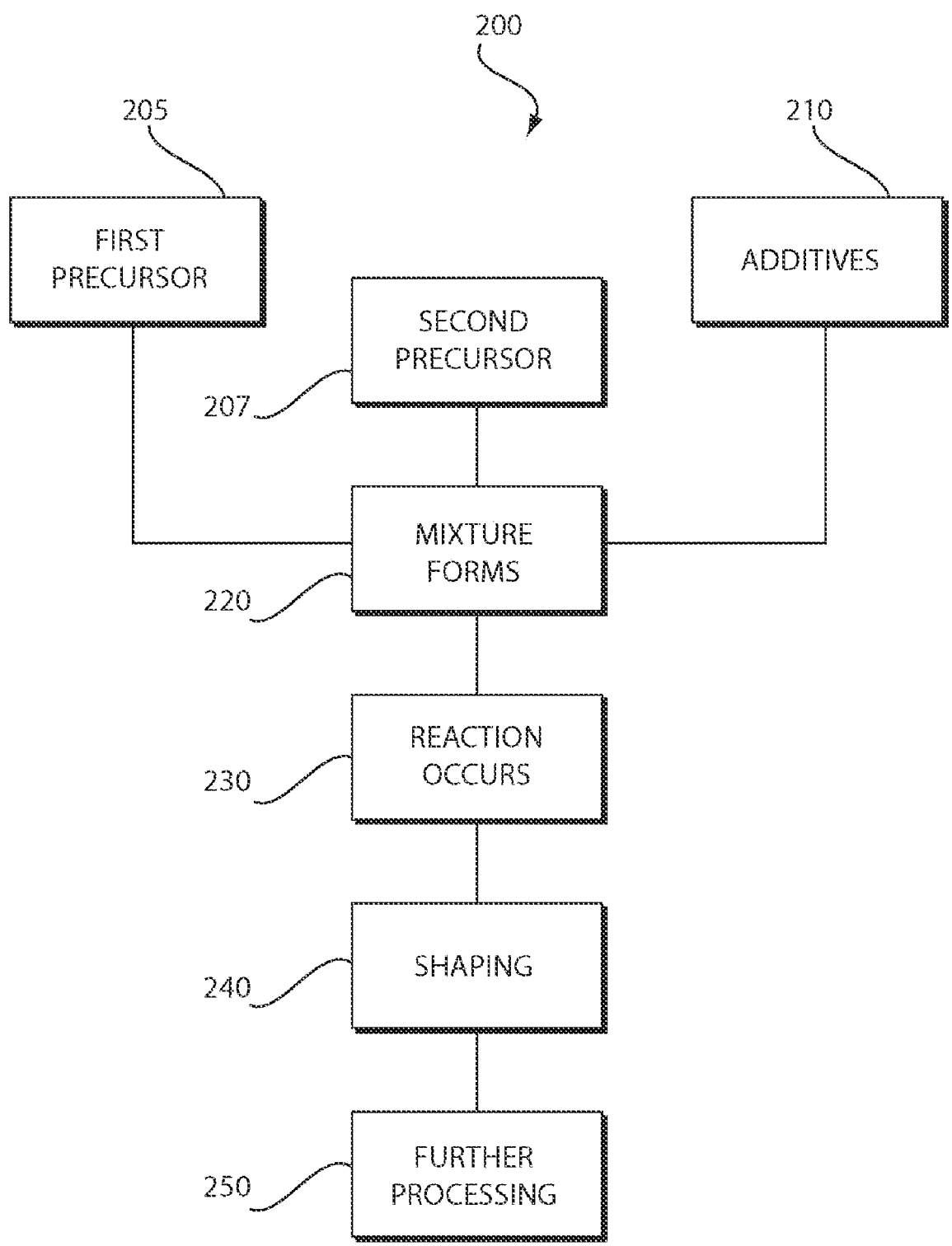
FIG. 4 is a flow chart illustrating another method of forming a fibrous material in accordance with an embodiment of the disclosure.

In another embodiment, shown in FIG. 4, a method 200 of forming a matrix of bonded fibers includes mixing at least two cordierite precursors (205 and 207) together with any optional additives 210 to form a mixture 220. One or more of the at least two cordierite precursors 205 and 207 is in fiber form. Energy, such as heat or light, is applied to the mixture to initiate a reaction 230 between the two or more cordierite precursors. The optional additives 210 are inert with respect to the at least two cordierite precursors 205 and 207, and as a result do not participate in the reaction. The reacted mixture 230 can then (optionally) shaped 240 into the fibrous body through extrusion, molding, or other shaping techniques. Optional processing steps 250, such as, for example, heat treating the fibrous body to remove or reduce the amount of optional additives 210, sintering the fibrous body to create bonds between fibers, introducing further porosity or directed flow channels into the fibrous body, depositing coatings, and/or incorporating the fibrous material into a filter or other apparatus can be performed after the fibrous body is shaped 240.

In various embodiments, including methods 100 and 200, a possible cordierite precursor is mullite (i.e., a fiber that includes both aluminum and silicon oxides); another possible precursor is alumina (e.g., $Al_2O_3$ powder); another possible precursor is colloidal alumina (e.g., NYACOL® AL20); still yet another precursor is colloidal silica. Possible cordierite precursors can also include one or more of talc, and MgO (e.g., from $MgCO_3$). Precursors 105/205 and 107/207 can come in a number of forms. For example, the precursors can be fiber based, colloidal based, particle/powder based, or liquid solution based. However, one or more of the at least two cordierite precursors (i.e., 105/205 and 107/207) is in the form of a fiber so that mixture 120/220 is a fiber based material. That is, at least one of precursors 105/205 and 107/207 is in the form of a fiber, such as, for example, mullite fibers, alumina silicate fibers, alumina fibers, or silicate fibers.

The cordierite precursors utilized in methods 100 and 200 can be supplied in various forms. As discussed above, one or more of the at least two cordierite precursors is in the form of a fiber so that any resulting mixture of the cordierite precursors is a fiber based material. An illustrative list of cordierite precursors in fiber form includes, but is not limited to: alumina silicate fibers, such as for example, mullite fibers, aluminosilicate fibers, strontium aluminum silicate fibers, lithium aluminum silicate fibers, and aluminoborosilicate fibers, $Al_2O_3$ fibers, and $SiO_2$ fibers. In general, these fibers have an aspect ratio (i.e., the ratio of the length of the fiber divided by the diameter of the fiber) greater than one. As used herein, the diameter of the fiber assumes for simplicity that the sectional shape of the fiber is a circle; this simplifying assumption is applied to fibers regardless of their true section shape (e.g., square, triangular, etc.) In certain embodiments, the fibers have an aspect ratio that is less than or equal to 2,000. That is, in certain embodiments, the fibers have a diameter in the micron or submicron range (e.g., 1 micron) while the length of the fibers is a few millimeters (e.g., 2 millimeters). In general, the fibers can have a diameter ranging from about 100 nm to about 100 microns. However, in certain embodiments, the fibers have a diameter within the range of about 100 nm to about 10 microns and in some embodiments, the fibers have a diameter within the range of about 2 microns to about 10 microns.

The at least two cordierite precursors can be all in fiber form or alternatively, the precursors can be any combination of fibers and some other form. Other cordierite precursors, which are not in fiber form, include but are not limited to: colloidal silica, silica particles, $Al_2O_3$ particles, sols of any material including Mg, Al, or Si. The above list of precursors is for illustrative purposes only and is by no means exhaustive. That is, any precursor material that when reacted with other constituents forms a portion of a cordierite fiber can be utilized in methods 100 and 200.

The specific cordierite precursors and precursor amounts utilized are selected in accordance with a target fiber chemistry and crystal structure. That is, the amount and type of cordierite precursor 105/205 and 107/207 are selected based on the target fiber chemistry and crystal structure. As a result, one can modify or alter the material properties of the fibrous material by selecting not only the types of precursors but also their relative amounts to each other.

In addition to determining the crystal structure of the resulting fiber, the relative amounts of the at least two precursors also affects the amount of precursor fibers that participate in reaction 140/230. In order for all of the precursor material to participate in the reaction 140/230 the relative amounts of the precursors should be substantially equal to their solubility limits for a particular solid solution having a particular crystal structure. If the relative amounts vary from the solubility limit but are still within a range therein to form a particular crystal structure, then the reaction can be limited due to a shortage of one or more elements. As a result, not all of the precursor fibers will participate in the reaction and thus some precursor fibers will remain in the fibrous body after reaction 140/230 has taken place. Accordingly, fibers can include less than 100% cordierite. For example, fibers can also include one or more of mullite, spinel, sapphirine, forsterite, olivine, cristobalite, clinoenstatite, proto enstatite, enstatite, kyanite, corundum, and magnesioferrite, as well as other amorphous/unidentified minerals.

With the ability to control fiber chemistry and crystal structure, the fibrous material can be tailored to provide a low CTE value. For example, alumina silicate, is known to have a relatively low average CTE value ($4.6 \times 10^{-6}$ per °C.). However, by modifying the ratios of $SiO_2$, $Al_2O_3$, and MgO in the mixture of cordierite precursor materials, lower CTE values, especially in a particular lattice direction can be achieved. Moreover, in certain embodiments, by providing fiber alignment within the fibrous material, further tailoring of the material's CTE value can be achieved. In various embodiments, precursors, reaction temperature, and reaction time can be selected to increase the wt % cordierite in the fibers (e.g., about 80 to about 95 wt %) in order to minimize CTE. In some embodiments, precursors, reaction temperature, and reaction time can be selected to decrease the wt % cordierite in the fibers (e.g., about 65 to about 80 wt %) while increasing other mineral components in order to maximize strength while maintaining a low CTE.

The fibrous materials resulting from methods 100 and 200 can be shaped into porous honeycomb substrates or bodies, which can be utilized as filters and in particular, filters for automotive applications.

Referring to FIG. 5, a porous honeycomb body 510 is shown. The honeycomb body 510 has an array of walls 515 that define channels 520 between adjacent walls 515. The walls 515 include the fibrous material described above. That is, the walls 515 include a plurality of cordierite fibers bonded to form a porous structure. The porous structure has at least 20% porosity and typically has an open-network of pores so that fluids can flow through the structure. At least 20% (e.g., 25%, 30%, 35%, 40%, 45%, 50%, 55%, 60%, 65%, 70%, 75%, 80%, 85%, and valued therebetween) of the cordierite fibers within the walls 515 are aligned. As a result, material properties, such as the coefficient of thermal expansion, which have directional values, can be potentially further manipulated to provide a lower value in a particular direction. That is, the fibers can be aligned along a particular lattice direction, such as the lattice parameter (a, b, or c) which has the lowest CTE value. For example, if a particular material has the lowest CTE along the c direction, then the fibers can be extruded or otherwise shaped such that at least 20% of the fibers are substantially aligned along the c direction. In some embodiments, between about 40% and about 85% of the fibers are aligned in a common direction. In certain embodiments, between about 60% and about 75% of the fibers are aligned in a common direction. The walls of the honeycomb body 510 can then be formed such that the c direction of the aligned fibers falls within the plane of the walls 515. As a result, the walls will experience the least amount of expansion when exposed to heat. Similarly, the fibers in the material can be aligned such that 20% or more (e.g., between about 60% and about 75%) of the fibers are aligned along a direction that has the highest CTE value. In this embodiment, the walls 515 of the honeycomb body 510 are formed such that the aligned fibers form the smallest dimension (i.e., depth) of the walls 515 so that the area greatest affected by heat is positioned to have the least structural effect.

The honeycomb body 510 can be fabricated in any number of shapes such as, for example, a cylinder (shown in FIG. 5), a pie-shaped wedge or subcylindrical section, a rectangle (as shown in FIG. 6), or a diamond. These honeycomb bodies 510 can be glued together to form a segmented body as shown in FIG. 6. As a result of gluing the bodies together, any size, shape, or dimension honeycomb form can be generated. With a low coefficient of thermal expansion porous fibrous material, it is possible to extrude or otherwise form shapes (e.g., cylinders) with large widths (e.g., diameters between 5.66 inches and 14 inches) without utilizing a low Young's modulus glue/adhesive to adjoin smaller segments to form a larger form. The ability to extrude or form larger widths provides flexibility in production techniques and potential cost reduction in volume production.

FIG. 7 depicts a cross-sectional representation of a filter 700 utilizing the porous honeycomb body 510 of FIG. 5. The filter 700 includes a housing 720, which surrounds the porous honeycomb body 510. The housing includes an inlet 705 and an outlet 707 through which gasses, such as exhaust gasses, travel through. Between the housing 720 and the honeycomb body 510 is a mat 730 that supports and forms an air-tight seal between the housing 720 and the honeycomb body 510. The honeycomb body 510 is configured in a wall-flow configuration by selectively plugging alternate channels, with outlet blocks 760 and inlet blocks 770 to form a plurality of respective inlet channels 740 and outlet channels 750. In this embodiment, the open network of pores within the walls 515 provides sufficient porosity and permeability to permit flow through the walls 515 between the inlet and outlet channels 740, 750. As a result, particulate matter can be accumulated on the surface of the inlet channel walls 740, and be removed from the gas stream by means of the filter 700. Coatings, such as, catalytic coatings or other reactive coatings, can be deposited along the walls 515 to increase the concentration of particles captured by the walls 515. For example, for a filter used in a diesel automotive environment, the walls 515 can be coated with a catalytic coating that facilitates oxidation of accumulated soot and accelerates the conversion of exhaust gas into less-harmful constituents. Techniques for applying catalytic and other types of coatings to substrates and porous bodies are well known in the field of art.

Figure 8:
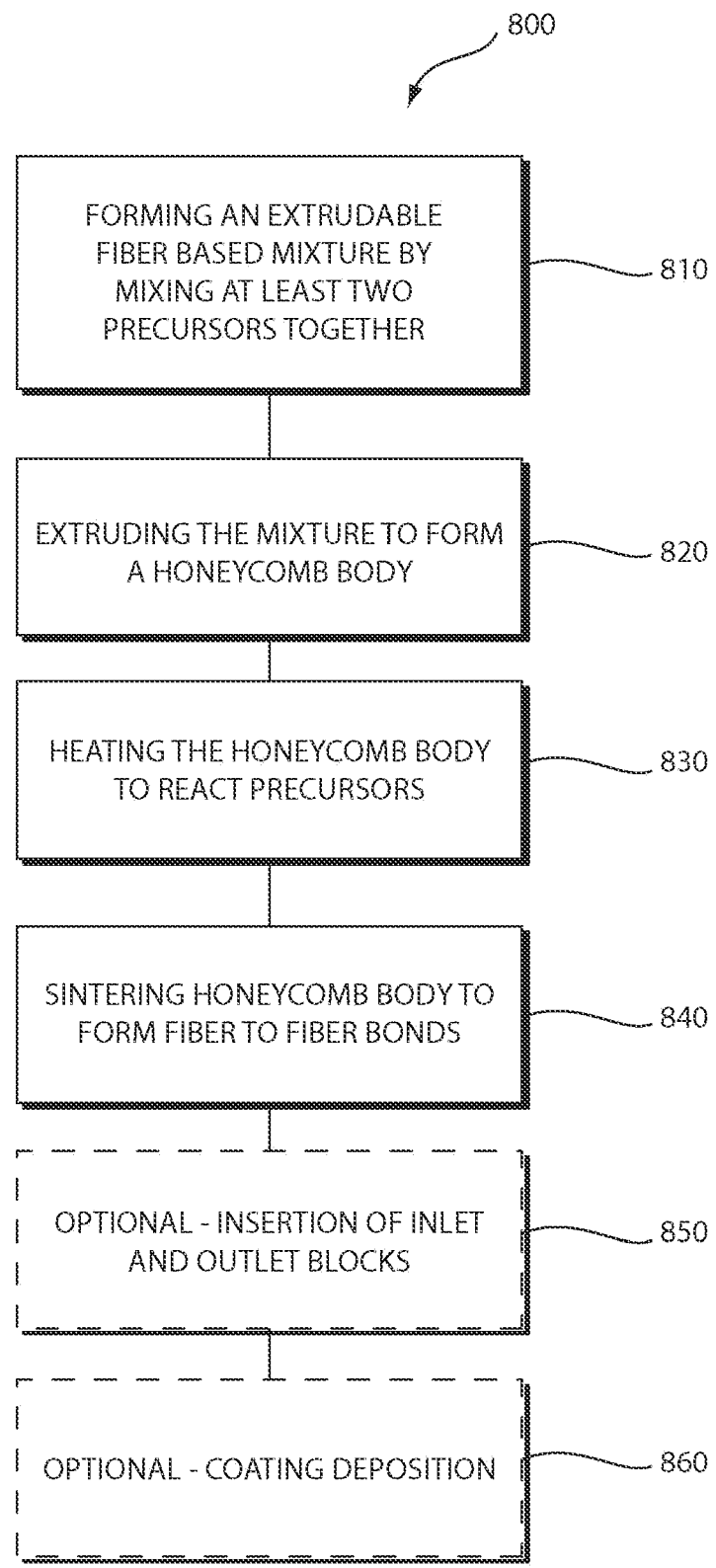
FIG. 8 is a schematic illustrating a method of forming a honeycomb body in accordance with an embodiment of the disclosure.

FIG. 8 illustrates a method of forming a porous honeycomb substrate, such as honeycomb body 510 of FIG. 5. First, as shown in step 810, at least two cordierite precursors, where at least one of the cordierite precursors is in a form of a fiber, are combined to form a mixture. The mixture includes about 43% to about 51% by weight $SiO_2$, about 36% to about 41% by weight $Al_2O_3$, and about 12% to about 16% by weight MgO. Fluid, pore formers, or rheology agents such as binders can also be added to the mixture to enable efficient extrusion or shaping of the mixture. After obtaining a desired consistency, the mixture is extruded into a honeycomb body having at least 20% porosity (step 820) and then heated to react the at least two cordierite precursors and to substantially eliminate or remove the optional additives (i.e., fluids, pore formers, and binders (step 830). The resulting fibers include about 50% to about 95% by weight cordierite. Bonds between fibers (e.g., fibers formed in step 830 and any unreacted fibers) are formed via sintering 840 the honeycomb body. In some embodiments, steps 830 and 840 occur during one heat treatment process. In other embodiments, multiple heat treating processes are utilized to react the cordierite precursors, to substantially eliminate optional additives, and to sinter fibers. In embodiments where the honeycomb body is a filter, inlet and outlet blocks (e.g., 740, 750 in FIG. 7) are inserted to create a flow path through the filter (optional step 850). In addition, a catalytic coating can be applied to the filter to provide the filter with reactive functionality in its intended application, such as, for example, to promote oxidation of captured soot in a diesel particulate filter (optional step 960).

Variations, modifications, and other implementations of what is described herein will occur to those of ordinary skill in the art without departing from the spirit and scope of the invention. For example, while an number of embodiments have been described in which the fibrous material has been utilized as a filter, especially a filter for diesel applications, the fibrous material can be used in any application where a low coefficient of thermal expansion ceramic material would be desired, such as for example, in the aerospace industry, liquid filtration, cross flow filtration, molten metal filtration, fixed bed chemical reactors, honeycomb high surface area adsorbents, and high temperature reactors.

Characteristics of Fibrous Cordierite Materials

Yield—For a given ratio of cordierite precursor materials, reacted at a given temperature, a mixture including fibrous precursors will have a higher cordierite yield than a mixture including only powdered precursors. It is hypothesized that the higher cordierite yield is facilitated by amorphous phase sintering (e.g., because a mixture including fibrous precursors has a greater proportion of the precursors in amorphous form as compared to a mixture including only powdered precursors). Thus, reactions with a mixture including fibrous precursors can occur at a lower temperature than with a mixture including only powdered precursors. These lower temperatures are advantageous in mixtures including fibrous precursors because higher temperatures (e.g., temperatures necessary to sinter powder precursors) can destroy the fibrous structure. While amorphous phase powdered precursors are available, they tend to increase manufacturing costs and are more difficult to process than corresponding amorphous phase fibrous precursors.

Surface area—Materials in fibrous form have less effective surface area than the same material in powder form where the particle diameter of the powder is about the same diameter as the fiber. However, the reaction of the materials in fibrous form to produce cordierite fibers can occur at lower temperatures and in shorter times than the reaction of the same materials in powder form. It is hypothesized that the lower temperatures and shorter times are also facilitated by amorphous-phase sintering. In general shorter times are also desirable because longer times (e.g., times necessary to sinter mixtures of powdered precursors) can result in undesirable shrinkage and loss of porosity.

Complete conversion—Cordierite precursor materials exhibit a complete conversion (e.g., not limited to the surface of a fiber precursors, the reaction proceeds substantially throughout the volume fiber) into the cordierite containing fibers. Thus, a substantially uniform and homogeneous cordierite containing composition results (e.g., as opposed to a composite structure of cordierite forming on the fiber surface and/or bonds with an aluminosilicate (or other) composition in the core of the fiber). Such a uniform and homogeneous fiber composition is desirable for low overall CTE structure, because they can reduce cracking due to CTE mismatch.

Surface structure—The fibrous cordierite materials exhibit a microcrystalline structure, as opposed to an agglomeration of large crystals, on the surface the fiber matrix. (It is also hypothesized that the microcrystalline structure extends throughout the fiber matrix.) The microcrystalline structure, which is a product of the relative ratios of precursors, low reaction temperatures, and short reaction times, can provide flexibility and lattice support for macro-porosity created by the space between fibers.

Microstructure—The relative ratios of precursors, where one or more of the precursors is in the form of a fiber, low reaction temperatures (e.g., about 1200° C. to about 1420° C.), and short reaction times (e.g., between about 2 hours and about 12 hours) result in the formation of a fibrous, cross-linked microstructure. The formation of the fibrous, cross-linked microstructure is unexpected because, due to the relatively low melting temperature of cordierite, one or ordinary skill in the art of cordierite materials would expect that sintering would eliminate fibers from the microstructure.

Unit cell size and porosity—The unit cell size of materials produced from fiber-based cordierite precursor materials is larger than the unit cell size of materials produced from powder-based cordierite precursors. The larger unit cell size results from the fact that fiber-based precursor materials have larger particle sizes than powder-based cordierite precursors. For example, fiber-based precursors include particle sizes of about 150 microns while powder-based precursors include particles sizes of about 15 microns. The larger unit cell size in fiber-based precursor materials is related to the higher porosity that can be obtained in such materials. In particular, fibrous precursors can create a scaffolding that functions as a support for the other precursors (e.g., a reactive carrier), which facilitates the formation of large pores. On the other hand, powder-based precursor materials must rely on pore formers and micro-porosity from out-gassing during sintering to provide porosity in the overall structure, which is less desirable than the fiber-base pores because it results in less open/interconnected pores (e.g., that do not facilitate gas or fluid flow as well as fiber-base pores).

Density and porosity—Cordierite formed from fiber-based materials is denser than cordierite formed from powder-based materials. This increased inherent density results from the fine grain structure of fiber-based cordierite materials, which result from the low formation temperatures and short reaction times disclosed herein. This density is also related to the differing porosity of fiber-based and powder-based cordierite materials. The porosity of the fibrous cordierite materials is provided by the space between the fibers, which is interconnected and allows for free gas or fluid flow. On the other hand, the porosity of powder-based cordierite materials results largely from out-gassing during sintering, and results in closed, non-interconnected pores that do not facilitate filtration or catalyst support.

Precursor Materials Selection

Figure 9:
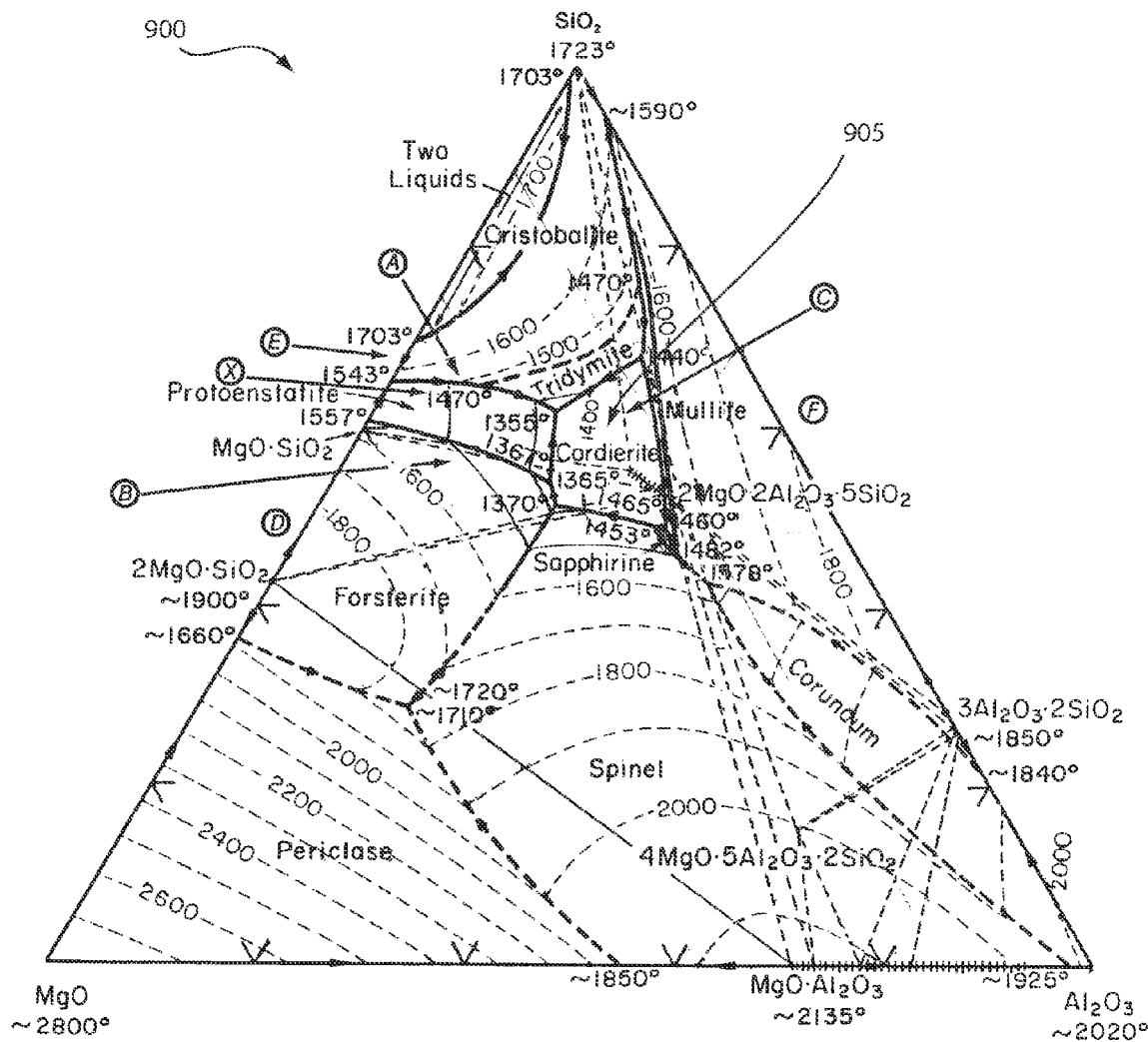
FIG. 9 is a phase diagram showing a cordierite phase as a function of temperature and relative composition of chemical components.

FIG. 9 is a phase diagram 900 showing a cordierite phase 905 as a function of temperature and relative composition of the $SiO_2$, $Al_2O_3$, and MgO components. The phase diagram 900 shows that crystalline cordierite exists under a broad range of $SiO_2$, $Al_2O_3$, and MgO ratios. It has been found that a subset of the cordierite phase is useful for making fibrous cordierite materials. In particular, it has been found that fibrous materials where the fibers have about 50% to about 95% by weight cordierite, and where the fibers are formed from a mixture of precursor materials including about 43% to about 51% by weight $SiO_2$, about 36% to about 41% by weight $Al_2O_3$, and about 12% to about 16% by weight MgO, are useful for making low CTE fibrous cordierite materials. (Although the relative wt % of $SiO_2$, $Al_2O_3$, and MgO are presented largely in the context of the mixture of precursor materials, it is believed that the relative wt % in the resulting fibers is substantially the same.)

In various embodiments, including the methods 100, 200, and 800, the types and amounts of cordierite precursor materials are selected to obtain a desired wt % of $SiO_2$, $Al_2O_3$, and MgO in the mixture. Table 2 illustrates examples of ratios (by wt %) precursor materials, ratios of $SiO_2$, $Al_2O_3$, MgO, and impurities in the precursor materials, and ratios of $SiO_2$, $Al_2O_3$, and MgO in the precursor materials. Thus, for a desired ratio of $SiO_2$, $Al_2O_3$, and MgO in the mixture of precursor materials (i.e., about 43% to about 51% by weight $SiO_2$, about 36% to about 41% by weight $Al_2O_3$, and about 12% to about 16% by weight MgO, where the total weight percent adds up to 100%), a recipe can be determined (note that numerous difference recipes can achieve a single final composition ratio). These relative ratios of precursor materials, where one or more of the precursor materials is in the form of a fiber, provide for high product yields (e.g., about 50 wt % to about 95 wt % cordierite) from low reaction temperatures (e.g., about 1200° C. to about 1420° C.) and short reaction times (e.g., between about 2 hours and about 12 hours) while maintaining fibrous structure in the product.

EXAMPLES

The following examples are provided to further illustrate and to facilitate the understanding of the disclosure. These specific examples are intended to be illustrative of the disclosure and are not intended to be limiting.

Examples of composition ratios of cordierite precursor materials, composition ratios of $SiO_2$, $Al_2O_3$, MgO, and impurities in the precursor materials, and final composition ratios of $SiO_2$, $Al_2O_3$, and MgO in the precursor materials. Silica is from colloidal silica and MgO is from $MgCO_3$. Here, Isofrax, aluminosilicate, and mullite are fibers, and silica, talc, and MgO are powders or colloids. ISOFRAX is a biosoluble magnesia aluminosilicate fiber available from UNIFRAX, Niagara Falls, N.Y. Aluminosilicate fiber is an amorphous 50/50 alumina/silica refractory ceramic fiber, such as FIBERFRAX HS-95C available from Unifrax, Niagara Falls, N.Y., or CERAFIBER from Thermal Ceramics, Augusta Ga., or any similar melt-spun or melt-blown aluminosilicate fiber. Mullite fiber is a polycrystalline mullite fiber, such as MAFTEC® fiber, available from Mitsubishi Chemical USA.

14 wt % MgO, about 36 wt % $Al_2O_3$, and about 49 wt % $SiO_2$ (see Batch # 1003 in Table 2), one can combine 20 wt % Isofrax fiber, 70 wt % aluminosilicate fiber, and 10 wt % MgO powder/colloid. Note that the final composition ratios of $SiO_2$, $Al_2O_3$, and MgO in the precursor materials are calculated exclusive of impurities in the starting materials. Note also that the final composition ratios of $SiO_2$, $Al_2O_3$, and MgO in the precursor materials are calculated exclusive of any fluid, binder, and pore former.

Examples of reaction temperature, reaction time, wt % cordierite (e.g., yield), and CTE. The "-" and following number in the Batch # represent a single sample from a given batch where multiple samples were synthesized and tested in a given batch (composition ratios of oxides given in Table 2).

TABLE 3

| Batch # | Temp (° C.) | Time (hr) | wt % Cordierite | CTE a-axis (E-6/° C.) | CTE b-axis (E-6/° C.) |
|---|---|---|---|---|---|
| 1269-52 | 1300 | 4 | 71 | 2.54 | 3.24 |
| 1276-19 | 1350 | 6 | 77 | 1.54 | 2.91 |
| 1318-5 | 1375 | 6 | 90 | 0.47 | 2.1 |
| 1003 | 1250 | 6 | 66 | 3.3 | 4.4 |
| 1083-5A | 1350 | 2 | 80 | 1 | 2.5 |
| 1083-5B | 1350 | 4 | 80 | 1.5 | 2.7 |
| 1150-10 | 1300 | 2 | 55 | 3.29 | 3.81 |
| 1161 | 1350 | 2 | 90 | 1.6 | 2.1 |
| 1170-14 | 1350 | 2 | 60 | 2.38 | 3.26 |
| 1170 | 1350 | 2 | 85 | 0.65 | -0.26 |
| 1170-16 | 1300 | 2 | 66 | 3.24 | 3.77 |
| 1197-2 | 1350 | 2 | 65 | 2.85 | 3.06 |
| 1199-18 | 1300 | 2 | 60 | 3.4 | 3.4 |

For a precursor mixture having a given composition ratio of cordierite precursor materials (i.e., calculated from a desired final composition ratio) a reaction temperature (e.g., about 1200° C. and about 1420° C.) and reaction time (e.g., between about 2 and about 12 hours) can be chosen. In general, a higher reaction temperature tends to form a higher wt % cordierite in the resulting fiber. For example, Batch # 1003 which was reacted at a temperature of 1250° C., produced a fiber including 66 wt % cordierite. In contrast, Batch #1318, which had the same reaction time and ratios of $SiO_2$, $Al_2O_3$, and MgO in the precursor materials as Batch #1003, but was reacted at a higher temperature of 1375° C., produced a fiber

TABLE 2

| | Ratios of precursor materials (wt %) | | | | | Ratios of $SiO_2$, $Al_2O_3$, MgO, and impurities (wt %) | | | | Final ratios of $SiO_2$, $Al_2O_3$, and MgO (wt %) | | |
|---|---|---|---|---|---|---|---|---|---|---|---|---|---|
| Batch # | Isofrax fiber | Aluminosilicate fiber | Mullite fiber | Silica powder/colloid | Talc powder/colloid | MgO powder/colloid | MgO | $Al_2O_3$ | $SiO_2$ | Imp. | MgO | $Al_2O_3$ | $SiO_2$ |
| 1003 | 20 | 70 | | | | 10 | 14 | 36 | 49 | 2 | 14 | 36 | 49 |
| 1269 | 13 | 74 | | | | 13 | 16 | 38 | 45 | 1 | 16 | 38 | 46 |
| 1276 | 13 | 74 | | | | 13 | 16 | 38 | 45 | 1 | 16 | 38 | 46 |
| 1318 | 20 | 70 | | | | 10 | 14 | 36 | 49 | 2 | 14 | 36 | 49 |
| 1083 | 20 | 70 | | | | 10 | 14 | 36 | 49 | 2 | 14 | 36 | 49 |
| 1150 | | | 51 | 6 | 43 | | 12 | 39 | 44 | 6 | 13 | 41 | 46 |
| 1161 | 17 | 70 | | | | 13 | 16 | 36 | 47 | 2 | 16 | 36 | 47 |
| 1170 | 13 | 74 | | | | 13 | 16 | 38 | 45 | 1 | 16 | 38 | 46 |
| 1197 | 13 | 74 | | | | 13 | 16 | 38 | 45 | 1 | 16 | 38 | 46 |
| 1199 | 13 | 74 | | | | 13 | 16 | 38 | 45 | 1 | 16 | 38 | 46 |

Table 2 provides several examples in accordance with the methods and materials described herein. These examples show fibrous materials that have a high percentage of cordierite in their final structures (e.g., after reactions 140, 230, 830). For example, to obtain a final composition ratio of about including 90% cordierite. Likewise, a longer reaction time also tends to form a higher wt % cordierite in the resulting fiber. For example, Batch # 1276 and 1197 had the same reaction temperature and ratios of $SiO_2$, $Al_2O_3$, and MgO in the precursor materials. However, Batch #1276, which had a longer reaction time than 1197 (6 hours versus 2 hours) also had a generally higher wt % cordierite in the resulting fiber (77 versus 65).

Similarly, a higher wt % cordierite correlates with a lower CTE in at least one direction. For example, Batch # 1318, 1276, 1003, and 1197, had wt % cordierite values of 90, 77, 66, and 65, respectively and CTE (a-axis) values of $0.47 \cdot 10^{-6}$ per °C., $1.54 \cdot 10^{-6}$ per °C., $3.3 \cdot 10^{-6}$ per °C., and $2.85 \cdot 10^{-6}$ per °C., respectively. However, these are general relationships and have deviations and exceptions due to other factors affecting the properties in question (e.g., fiber alignment can also affect CTE).

Figure 10:
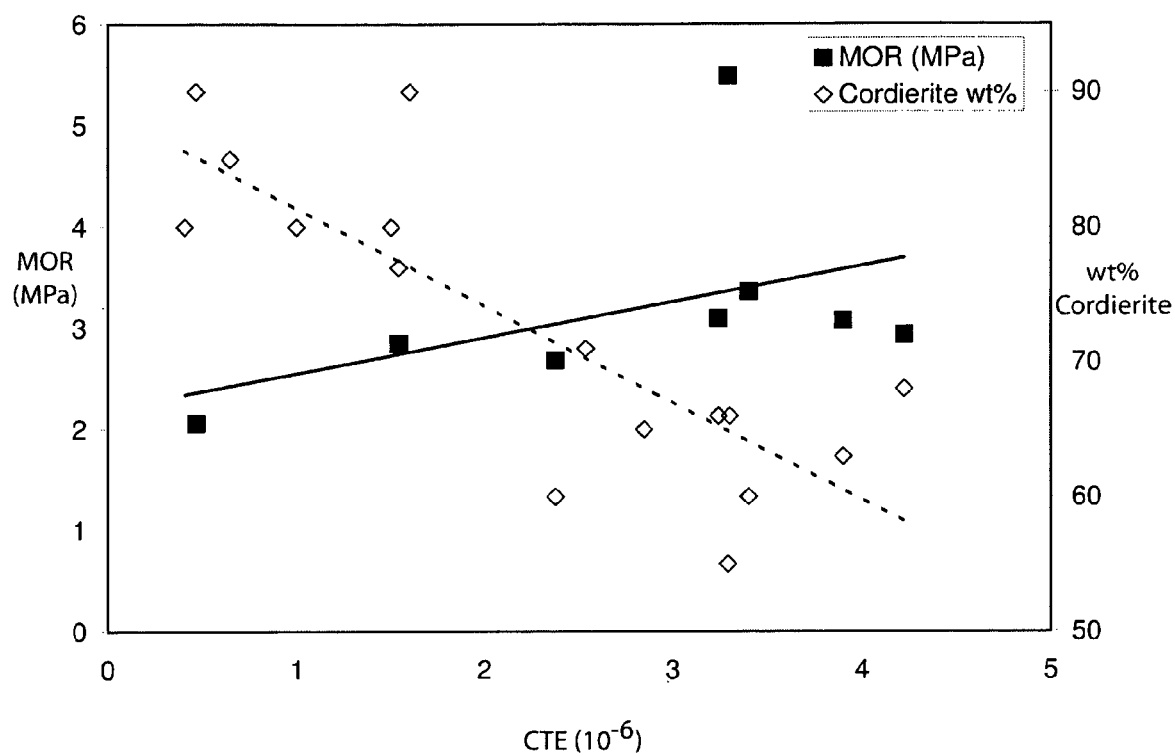
FIG. 10 is a plot of experimental data illustrating the general relationships between wt % cordierite and CTE, as well as MOR and CTE.

FIG. 10 is a plot of experimental data illustrating the general relationships between wt % cordierite and CTE, as well as MOR and CTE, including samples from Table 3. The open diamond data points and dashed line illustrate the relationship between wt % cordierite and CTE ($10^{-6}$ per °C.). The solid square data points and solid line illustrate the relationship between MOR (MPa) and CTE ($10^{-6}$ per °C.).

FIG. 10 shows that the CTE in at least one direction of each sample is less than about $3.8 \cdot 10^{-6}$ per °C. The figure also shows that, in general, the CTE in at least one direction decreases as the wt % cordierite increases. As a result, the disclosed methods and materials provide a high cordierite yield and produce lower CTE values for a given composition of a mixture of precursor materials. Note that as the wt % cordierite increases, the wt % of other oxide components decreases. In various embodiments, a decrease in components having a higher CTE than cordierite (e.g., mullite) contributes to a lower CTE value.

FIG. 10 shows that the MOR of each sample is less than about 8.5 MPa. The figure also shows that, in general, the CTE in at least one direction increases as MOR increases. Likewise, MOR, in general, increases as wt % cordierite decreases. In various embodiments, an increase in MOR results from an increase in other oxides (e.g., mullite) as wt % cordierite decreases. In some embodiments, an increase in CTE can be mitigated or compensated for, by a corresponding increase in MOR. For example, potential cracking due to increased thermal expansion can be mitigated by increased strength.

Accordingly, it is possible to obtain a desired CTE (as well as influence strength) by selecting ratios of $SiO_2$, $Al_2O_3$, and MgO in the precursor materials as well as the temperature and the time of heating.

What is claimed is:

1. A method of manufacturing a fibrous material, the method comprising:
   mixing at least two cordierite precursor materials to form a mixture, wherein one or more of the at least two cordierite precursor materials is in a form of a fiber, and wherein the mixture comprises about 43% to about 51% by weight $SiO_2$, about 36% to about 41% by weight $Al_2O_3$, and about 12% to about 16% by weight MgO;
   extruding the mixture to create a fibrous body, wherein the one or more of the at least two cordierite precursor materials in the form of a fiber are interlocking; and
   heat treating the fibrous body, at a temperature of about 1200° C. to about 1420° C., to form the fibrous material, the fibrous material forming a three dimensional porous structure and having a composition comprising about 50% to about 95% by weight cordierite.

2. The method of claim 1 wherein heat treating has a duration between about 2 and about 12 hours.

3. The method of claim 1 wherein the temperature is about 1250° C. to about 1375° C.

4. The method of claim 1 wherein the fibrous material comprises about 65% to about 90% by weight cordierite.

5. The method of claim 1 wherein the mixture further comprises one or more additives selected from the group consisting of a fluid, a binder, and a pore former.

6. The method of claim 5 wherein the one or more additives are substantially removed by heating the fibrous body.

7. A method of manufacturing a matrix of bonded fibers, the method comprising:
   mixing at least two cordierite precursor materials to form a mixture, wherein one or more of the at least two cordierite precursor materials is in a form of a fiber, and wherein the mixture comprises about 43% to about 51% by weight $SiO_2$, about 36% to about 41% by weight $Al_2O_3$, and about 12% to about 16% by weight MgO; and
   reacting the at least two cordierite precursor materials, at a temperature of about 1200° C. to about 1420° C., to form the matrix of interlocking and bonded fibers within the mixture, the matrix of bonded fibers forming a three dimensional porous structure and having a composition comprising about 50% to about 95% by weight cordierite.

8. The method of claim 7 wherein heat treating has a duration between about 2 and about 12 hours.

9. The method of claim 7 wherein the temperature is about 1250° C. to about 1375° C.

10. The method of claim 7 wherein the matrix of bonded fibers comprises about 65% to about 90% by weight cordierite.

11. The method of claim 7 wherein between about 40% and about 85% of fibers within the matrix of bonded fibers are aligned in a common direction.

12. The method of claim 7 wherein between about 60% and about 75% of fibers within the matrix of bonded fibers are aligned in a common direction.

13. The method of claim 7 wherein the mixture further comprises one or more additives selected from the group consisting of a fluid, a binder, and a pore former.

14. The method of claim 13 wherein the one or more additives are substantially removed by reacting the at least two cordierite precursor materials.

15. The method of claim 7 further comprising shaping the mixture into a fibrous body.

16. A method of forming a porous honeycomb substrate, the method comprising:
   mixing at least two cordierite precursor materials to form a mixture, wherein one or more of the at least two cordierite precursor materials is in a form of a fiber, and wherein the mixture comprises about 43% to about 51% by weight $SiO_2$, about 36% to about 41% by weight $Al_2O_3$, and about 12% to about 16% by weight MgO;
   extruding the mixture to form a honeycomb substrate having a porosity of at least about 20%, wherein the one or more of the at least two cordierite precursor materials in the form of a fiber are interlocking; and
   heat treating the honeycomb substrate, at a temperature of about 1200° C. to about 1420° C., to react the at least two cordierite precursor materials to form a plurality of fibers in a three dimensional porous structure and having a composition comprising about 50% to about 95% by weight cordierite.

17. The method of claim 16 wherein heat treating has a duration between about 2 and about 12 hours.

18. The method of claim 16 wherein the temperature is about 1250° C. to about 1375° C.

19. The method of claim 16 wherein the plurality of fibers comprise about 65% to about 90% by weight cordierite.

20. The method of claim 16 wherein the mixture further comprises one or more additives selected from the group consisting of a fluid, a binder, and a pore former.

21. The method of claim 20 wherein the one or more additives are substantially removed by heating the honeycomb substrate.

22. A fibrous body comprising:
an extruded substrate including a plurality of interlocking fibers forming a three dimensional porous structure comprising about 50% to about 95% by weight cordierite; and
the extruded substrate having a coefficient of thermal expansion in at least one direction of less than about $3.8 \cdot 10^{-6}$ per °C.

23. The fibrous body of claim 22 wherein the fibers have a coefficient of thermal expansion in at least one direction of less than about $2.5 \cdot 10^{-6}$ per °C.

24. The fibrous body of claim 22 wherein the fibers have a coefficient of thermal expansion in at least one direction between about $-12 \cdot 10^{-7}$ and about $3.8 \cdot 10^{-6}$ per °C.

25. The fibrous body of claim 22 wherein between about 40% and about 85% of fibers within the fibrous body are aligned in a common direction.

26. The fibrous body of claim 22 wherein between about 60% and about 75% of fibers within the fibrous body are aligned in a common direction.

27. The fibrous body of claim 22 further comprising a crush strength between about 250 psi and about 2500 psi.

28. The fibrous body of claim 22 further comprising a modulus of rupture between about 1.6 MPa and about 8.5 MPa.

29. The fibrous body of claim 22 further comprising a modulus of rupture below about 5.6 MPa.

30. The fibrous body of claim 22 further comprising a modulus of elasticity between about 2.8 GPa and about 10.3 GPa.

31. The fibrous body of claim 22 further comprising about 43% to about 51% by weight $SiO_2$, about 36% to about 41% by weight $Al_2O_3$, and about 12% to about 16% by weight MgO.

32. The fibrous body of claim 22 wherein the extruded substrate is formed from a mixture of cordierite precursors comprising about 43% to about 51% by weight $SiO_2$, about 36% to about 41% by weight $Al_2O_3$, and about 12% to about 16% by weight MgO.

33. A fibrous honeycomb body comprising:
a honeycomb array of walls defining channels between adjacent walls; the walls comprising a plurality of interlocking fibers bonded to form a three dimensional porous structure having an open network of pores, the plurality of fibers comprising about 50% to about 95% by weight cordierite; and
the honeycomb having a coefficient of thermal expansion in at least one direction of less than about $3.8 \cdot 10^{-6}$ per °C.

34. The fibrous honeycomb body of claim 33 wherein the fibers have a coefficient of thermal expansion in at least one direction of less than about $2.5 \cdot 10^{-6}$ per °C.

35. The fibrous honeycomb body of claim 33 wherein the fibers have a coefficient of thermal expansion in at least one direction between about $-12 \cdot 10^{-7}$ and about $3.8 \cdot 10^{-6}$ per °C.

36. The fibrous honeycomb body of claim 33 wherein between about 40% and about 85% of fibers within the fibrous honeycomb body are aligned in a common direction.

37. The fibrous honeycomb body of claim 33 wherein between about 60% and about 75% of fibers within the fibrous honeycomb body are aligned in a common direction.

38. The fibrous honeycomb body of claim 33 further comprising a crush strength between about 250 psi and about 2500 psi.

39. The fibrous honeycomb body of claim 33 further comprising a modulus of rupture between about 1.6 MPa and about 8.5 MPa.

40. The fibrous honeycomb body of claim 33 further comprising a modulus of rupture below about 5.6 MPa.

41. The fibrous honeycomb body of claim 33 further comprising a modulus of elasticity between about 2.8 GPa and about 10.3 GPa.

42. The fibrous honeycomb body of claim 33 further comprising a catalytic coating on the plurality of fibers.

43. The fibrous honeycomb body of claim 33 further comprising about 43% to about 51% by weight $SiO_2$, about 36% to about 41% by weight $Al_2O_3$, and about 12% to about 16% by weight MgO.

44. The fibrous honeycomb body of claim 33 wherein the plurality of fibers are formed from a mixture of cordierite precursors comprising about 43% to about 51% by weight $SiO_2$, about 36% to about 41% by weight $Al_2O_3$, and about 12% to about 16% by weight MgO.

45. A filter comprising:
a housing including an inlet and an outlet; and
the fibrous honeycomb body of claim 33 disposed between the inlet and the outlet.

46. The filter of claim 45 further comprising at least one catalyst deposited on the plurality of fibers of the walls.

* * * * *